United States Patent [19]

Yanagishita

[11] Patent Number: 5,096,403
[45] Date of Patent: Mar. 17, 1992

[54] MOLD FOR MANUFACTURING SKIN COVERED FOAMED PLASTIC SEAT WITH HOLES

[75] Inventor: Norio Yanagishita, Ayase, Japan

[73] Assignee: Ikeda Bussan Co., Ltd., Kanagawa, Japan

[21] Appl. No.: 649,167

[22] Filed: Feb. 1, 1991

Related U.S. Application Data

[63] Continuation of Ser. No. 395,035, Aug. 17, 1989, abandoned.

[51] Int. Cl.⁵ .................................. B29C 39/10
[52] U.S. Cl. .................................. 425/127; 249/91; 249/175; 264/46.4; 425/117; 425/817 R
[58] Field of Search .......... 425/4 R, 116, 117, 127, 425/817 R; 264/46.4, 46.6, 46.8, 46.9; 249/85, 91, 95, 83, 175

[56] References Cited

U.S. PATENT DOCUMENTS 1,752,295 4/1930 Felix .................................. 264/46.4

FOREIGN PATENT DOCUMENTS 58-101027 6/1983 Japan .................................. 264/46.8
1075712 7/1967 United Kingdom ............ 425/817 R Primary Examiner—Jay H. Woo
Assistant Examiner—James P. Mackey
Attorney, Agent, or Firm—Weiser & Stapler

[57] ABSTRACT

A mold for manufacturing a skin covered foamed plastic seat capable of structually preventing the leakage of the liquid foam resin from a space between the skin cover and the bossings provided on the mold for the holes to be made on it. The mold includes a lower mold over which a sink cover is to be placed, having a protruded portion to be inserted into a hole on the skin cover corresponding to a hole to be made on the skin covered foamed plastic seat, the protruded portion having a circumference smaller than that of the hole on the skin cover, and the upper mold to be assembled with the lower mold, having a bossing for making the hole to be made on the skin covered foamed plastic seat, the bossing having a concavity to be engaged with the protruded portion of the lower mold at a bottom, and a circumference larger than that of the hole on the skin cover.

1 Claim, 2 Drawing Sheets

MOLD FOR MANUFACTURING SKIN COVERED FOAMED PLASTIC SEAT WITH HOLES

This application is a continuation of application Ser. No. 07/395,035 filed Aug. 17, 1989 now abandoned.

BACKGROUND OF THE INVENTION

1. Field of the Invention

The present invention relates to a mold for manufacturing a skin covered foamed plastic seat and, more particularly, to such a mold for a seat incorporating holes at desired positions in a process of manufacturing.

2. Description of the Background Art

Car seat cushions and seat backs have been made of a pad member covered by a skin cover. The pad member and the skin cover used to be manufactured separately and combined together later, but it has become fashionable to manufacture a skin covered pad member altogether by making the foamed plastic inside the skin cover placed over a molding surface, so that the process of combining at a later time may be omitted.

In such a skin covered foamed plastic seat, holes for inserting such things as head rest supports and rotation hinge supporters are often incorporated in the process of manufacturing.

One of the most common problems encountered in such a process of manufacturing a skin covered pad member is the leakage of the liquid foam resin which will become a pad member onto the front surface of the skin cover.

In general, the skin cover is made from air impermeable materials, but even when an air permeable front surface skin is used, a backing material or wadding which is air impermeable can be used. This wadding may be effective enough to prevent the leakage of the liquid foam resin, but for a skin covered pad member such as that to be used for a rear seat cushion which is required to have holes for the seat belts, the problem of the leakage of the liquid foam resin can be prominent.

More specifically, the required holes on the skin covered pad member are manufactured by using a mold such as that shown in FIG. 1, comprising an upper mold 1 and a lower mold 2 to be assembled with the upper mold having a bossing 3 corresponding to the holes to be made on the skin covered foamed plastic seat. Now, when the skin cover 4 comprising the surface skin 6a and the wadding 6b is placed over the lower mold 2, there is usually a small space between the bossing 3 and the edge 4a of the skin cover 4, so that when the liquid foam resin is poured into the mold, the leakage of the liquid foam resin through such a space between the bossing 3 and the edge 4a of skin cover 4 occurs, and the leaked liquid foam resin will be foamed on the front surface of the skin cover 4 and will have to be removed afterwards. This leaked foam resin after the foaming of the liquid foam resin is not easily removable, so that the leakage of the liquid foam resin can severely affect the manufacturing efficiency.

Even when the bossing 3 is made to fit with the edge 4a of the skin cover 4 tightly at the beginning of the manufacturing process, the force due to the expansion of the liquid foam resin in the foaming process will tend to pull the skin cover 4 away from the bossing 3 and can create a space between the bossing 3 and the edge 4a of the skin cover 4, so that the leakage cannot be prevented.

A conventional method to deal with this situation has been sealing of the edge 4a of the skin cover 4 by tapes, but because of the same force due to the expansion of the liquid foam resin in the foaming process, such a sealing is often not very secure, so that it is not considered as an effective protection against this type of leakage.

SUMMARY OF THE INVENTION

It is therefore an object of the present invention to provide a mold for manufacturing a skin covered foamed plastic seat capable of structurally preventing the leakage of the liquid foam resin from a space between the skin cover and the bossings provided on the mold for the holes to be made on it, and thereby improving the manufacturing efficiency of such a skin covered foamed plastic seat with holes.

This object is achieved by the present invention by providing a mold for manufacturing a skin covered foamed plastic seat, comprising a lower mold over which a skin cover is to be placed, having a protruded portion to be inserted into a hole in the skin cover corresponding to a hole to be made in the skin covered foamed plastic seat, the protruded portion having a circumference smaller than that of the hole in the skin cover; and an upper mold to be assembled with the lower mold, having a bossing for making the hole to be made in the skin covered foamed plastic seat, the bossing having a concavity to be engaged with the protruded portion of the lower mold at its bottom, and a circumference larger than that of the hole in the skin cover.

Other features and advantages of the present invention will become apparent from the following description taken in conjunction with the accompanying drawings.

DETAILED DESCRIPTION OF THE PREFERRED EMBODIMENTS

Figure 1:
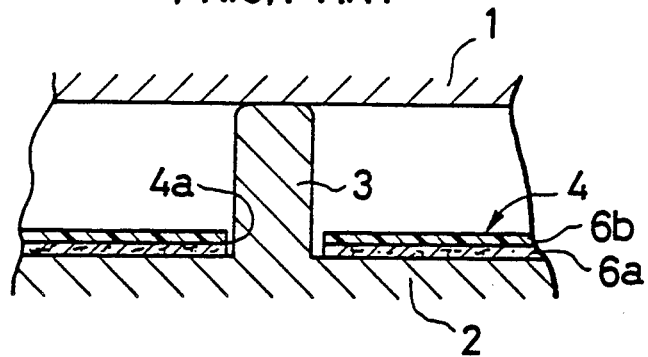
FIG. 1 is a magnified cross sectional view of a bossing of a conventional mold for manufacturing the skin covered foamed plastic seat with holes.
Figure 2:
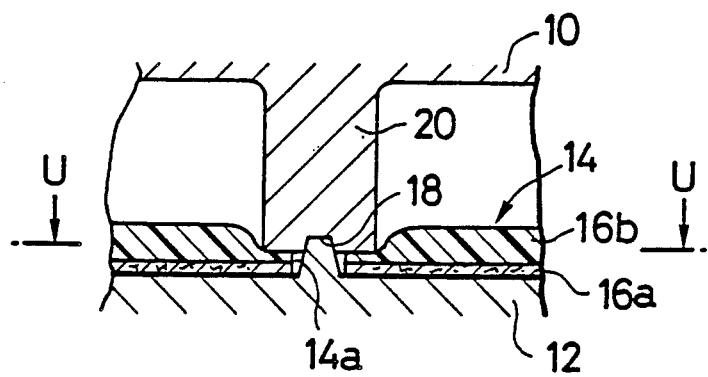
FIG. 2 is a magnified cross sectional view of a bossing of one embodiment of a mold for manufacturing the skin covered foamed plastic seat according to the present invention.

Referring now to FIG. 2, there is shown one embodiment of a mold for manufacturing a skin covered foamed plastic seat according to the present invention.

In this embodiment, a mold comprises an upper mold 10 having a bossing 20 corresponding to a hole to be made on a skin covered foamed plastic seat which has a concavity for an engagement at its bottom, and a lower mold 12 to be assembled with the upper mold 10 having a protruded portion 18 at a center of the location of the hole to be made on the skin covered foamed plastic seat which is to be engaged into the concavity at the bottom of the bossing 20.

In manufacturing the skin covered foamed plastic seat, first a skin cover 14 comprised of a surface skin 16a and a wadding 16b with a hole 14a corresponding to the hole to be made on the skin covered foamed plastic seat will be placed over a molding surface of the lower mold 12, with the protruded portion 18 inserted into the hole 14a of the skin cover 14.

Figure 3:
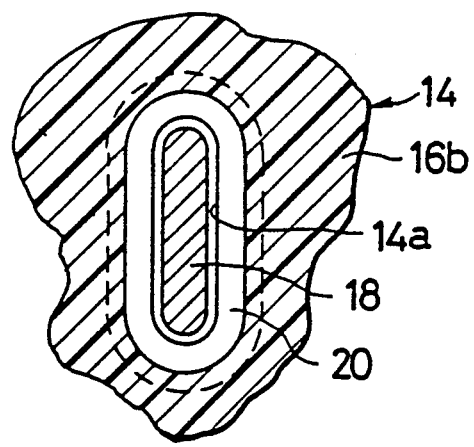
FIG. 3 is a horizontal cross sectional view of the embodiment of FIG. 2 at a plane specified by U.

Next the upper mold 10 and the lower mold 12 will be assembled such that the protruded portion 18 of the lower mold 12 engages the concavity at the bottom of the bossing 20 of the upper mold 10. Here, bottom edges of the bossing 20 will compress edges of the skin cover 14 around the hole 14a, as shown in FIG. 2, so that the hole 14a is completely sealed off from the cavity between the upper mold 10 and the lower mold 12. The horizontal cross section of the assembled upper mold 10 and lower mold 12 at a plane specified by a letter U in FIG. 2 is shown in FIG. 3. As can be seen from this FIG. 3, the protruded portion 18, the hole 14a, and the bossing 20 have an elongated circular shape in this embodiment with increasing circumferences in this order.

The skin covered foamed plastic seat is then made by pouring liquid foam resin into a cavity formed between the assembled upper mold 10 and lower mold 12, which will subsequently become the pad member covered by the skin cover 14 after the foaming process. Here, because the hole 14a of the skin cover is completely sealed off as described above, the leakage of the liquid foam resin from this hole 14a to a side of the surface skin 16a can be prevented.

Figure 4:
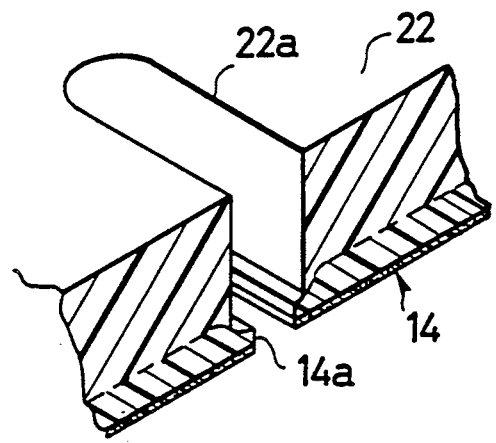
FIG. 4 is a perspective view with cutaway to show a cross section of a skin covered foamed plastic seat in the vicinity of a hole manufactured by the embodiment of the mold of FIG. 2.

FIG. 4 shows the skin covered foamed plastic seat 22 at a portion around the hole 22a of elongated circular shape, with the compressed edges of the hole 14a of the skin cover 14 extending into the hole 22a. This configuration of the skin covered foamed plastic seat 22 has the following advantages. First, the extension of the edges of the hole 14a provides a flexibility in inserting head rest supports or rotation hinge supporters into the hole 22a. Also, this extension can effectively conceal the inner face of the hole 22a from direct visual exposure, which forms the skin covered foamed plastic seat 22 as a product with a neater appearance. Also, when foamed plastic permeated, this compressed edge of the hole 14a is harder than other portions so that it can serve as a reinforcement around the hole 22a.

Figure 5:
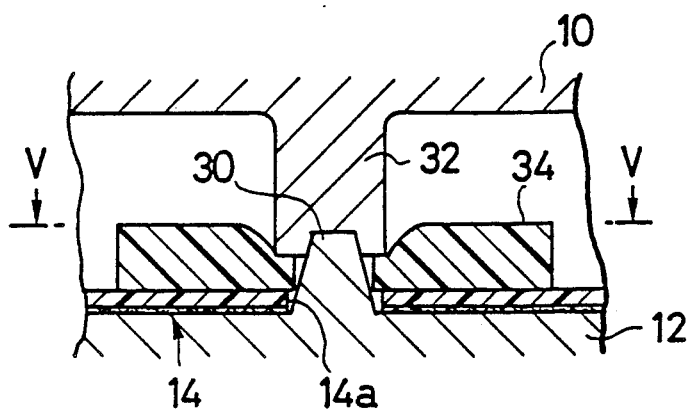
FIG. 5 is a magnified cross sectional view of a bossing of another embodiment of a mold for manufacturing the skin covered foamed plastic seat according to the present invention.
Figure 6:
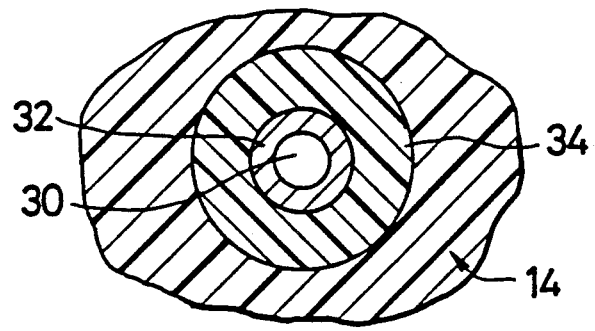
FIG. 6 is a horizontal cross sectional view of the embodiment of FIG. 5 at a plane specified by V.

Referring now to FIGS. 5 and 6, there is shown another embodiment of a mold for manufacturing a skin covered foamed plastic seat according to the present invention.

In this embodiment, the protruded portion 18 and the bossing 20 of the previous embodiment are replaced by a protruded portion 30 and a bossing 32 both of which have circular cross section, as can be seen from FIG. 6 showing the horizontal cross section of the assembled upper mold 10 and lower mold 12 at a plane specified by a letter V in FIG. 5. In addition, in this embodiment, an additional wadding member 34 is to be inserted over the skin cover 14 in a vicinity of the hole 14a, which will be compressed by the bottom edge of the bossing 32 when the upper mold 10 and the lower mold 12 are assembled together, as shown in FIG. 5.

Obviously, just as in the previous embodiment, the hole 14a of the skin cover is completely sealed off by the bossing 32, so that the leakage of the liquid foam resin from this hole 14a to a side of the surface skin can be prevented in this embodiment as well. Likewise, the similar advantages as described for the previous embodiment above can be achieved by this embodiment. In particular, in this embodiment, the additional wadding member 34 can provide an additional reinforcement around the hole on the skin covered foamed plastic seat manufactured.

It is to be noted that many modifications and variations of the above embodiment may be made without departing from the novel and advantageous features of the present invention. Accordingly, all such modifications and variations are intended to be included within the scope of the appended claims.

What is claimed is:

1. A mold for manufacturing a skin covered foamed plastic seat, comprising:

a lower mold for receiving a skin cover comprised of a surface skin and a wadding, having a protruded portion to be inserted into a hole in the skin cover corresponding to a hole to be made in the skin covered foamed plastic seat, to secure the skin cover in position on the lower mold, the protruded portion having a circumference smaller than that of the hole in the skin cover; and an upper mold to be assembled with the lower mold to form a cavity for receiving a liquid foam resin, having a bossing for making the hole to be made in the skin covered foamed plastic seat, the bossing having means for preventing penetration of the liquid foam resin to edge portions of the skin cover around the hole in the skin cover, including a bottom face with a circumference larger than that of the hole in the skin cover for compressing edges of the wadding of the skin cover around the hole in the skin cover against the lower mold when the lower mold and the upper mold are assembled, and a concavity on the bottom face to be engaged with the protruded portion of the lower mold.

* * * * *